July 9, 1963

J. G. THOMAS 3,096,887

REMOVABLE POWER AND MANUALLY OPERATED
OUTRIGGERS FOR CARRIER FRAMES

Filed Nov. 9, 1960

James G. Thomas
INVENTOR.

BY

James G. Thomas
INVENTOR.

July 9, 1963
J. G. THOMAS
3,096,887
REMOVABLE POWER AND MANUALLY OPERATED
OUTRIGGERS FOR CARRIER FRAMES
Filed Nov. 9, 1960
3 Sheets-Sheet 3

James G. Thomas
INVENTOR.

United States Patent Office 3,096,887
Patented July 9, 1963

3,096,887
REMOVABLE POWER AND MANUALLY OPERATED OUTRIGGERS FOR CARRIER FRAMES
James G. Thomas, 157 Forrest Ave. N., Camden, Tenn.
Filed Nov. 9, 1960, Ser. No. 68,248
18 Claims. (Cl. 212—145)

This invention comprises novel and useful removable power and manually operated outriggers for carrier frames and more particularly relates to an outrigger construction for imparting greater lateral stability to cranes or similar vehicles and which may be readily applied to conventional vehicles as an attachment therefor.

The present invention is similar in subject matter to that disclosed in my copending application Serial No. 18,948, filed March 31, 1960 entitled Combined Power and Manually Operated Outriggers for Carrier Frames and constitutes certain structural modifications and improvements thereover.

The primary object of this invention is to provide a stabilizer construction detachably mounted upon the chassis of wheeled vehicles which will thereby provide a much greater lateral stability upon such vehicles as for example when the vehicles are employed as power operated cranes, draglines, shovels, clamshells, trench hoes and the like.

A further object of the invention is to provide an attachment capable of being readily and conveniently applied to and removed from conventional vehicle frames and which when so applied will enable the use of power operating means to selectively extend the outrigger construction into an operative position or to retract the same into an inoperative position.

Another object of the invention is to provide a detachable stabilizing construction as set forth in the preceding objects which combine in an improved manner a conventional manually operated lateral stabilizer with a power operated stabilizer.

A still further important object of the invention is to provide a detachable stabilizer construction in accordance with the preceding objects wherein there is obtained a much more rigid bracing between both the manually and power operated stabilizers and the frame of the vehicle.

Still another object of the invention is to provide a hydraulically operated extensible stabilizer of a demountable construction whereby the power operating means effecting positive extension and retraction of the stabilizer legs will be relieved from the weight of the vehicle disposed upon the legs with this weight being carried fully or in part solely by the structure of the extensible stabilizer and its mounting and bracing structure and not by the hydraulic jack elements disposed therein and connected thereto.

It is a still further object of the invention to provide a demountable or removable stabilizer construction in which the power operated stabilizer components shall be capable of being locked releasably in selectively retracted or extended positions in order that the stabilizer may in no way interfere with the mobility of the vehicle when retracted, wherein the stabilizer may be readily available for use as desired, and wherein the stabilizer may be securely maintained in its extended position even in the event of a failure in the power operating means of the stabilizer.

Still another and more specific object of the invention is to provide an easily applied and readily removable stabilizer construction into which manually operated and power operated outriggers are incorporated and which shall have an improved means whereby the attachment may be secured to the chassis of a vehicle in a manner affording firm support for the vehicle and yet which may be quickly and readily released therefrom.

Still another very important object of the invention is to provide a stabilizer construction of a demountable character as set forth hereinbefore and wherein the axes of the downwardly divergent power operated stabilizing legs may be readily initially set at different included angles and thereafter may be securely retained in the selected angular disposition.

A further important object of the invention is to provide a demountable stabilizer construction having a pair of power operated longitudinally extensible downwardly divergent stabilizer legs and wherein each leg shall consist of a pair of telescoping upper and lower sections with the upper section detachably secured to a longitudinal frame member of the chassis of a vehicle upon the exterior of the side thereof and with the lower section being retractible through an opening in the longitudinal chassis frame member to a more compact retracted position.

A still further important specific object of the invention is to provide a demountable unitary stabilizing construction into which are combined, manually operated and power operated stabilizer outriggers and which shall have an improved rigid connection between the various elements as well as a readily detachable element between the assembly and the longitudinal side frame members of a vehicle chassis, and wherein the structure of the demountable attachment shall greatly contribute to and reinforce the longitudinal frame members of the vehicle chassis.

Still another important object of the invention is to provide a readily demountable power operated stabilizer construction wherein upon retraction of the power operated stabilizer, the manually operated stabilizer will be retained by the former in retracted position, and whereby the power operated stabilizer shall be so constructed and mounted as to permit ready access thereto for servicing or disassembling.

Still another important specific object of the invention is to provide a stabilizing construction in accordance with the foregoing objects which shall include power operating means therefor which are compactly sheltered and housed within the telescoping upper and lower members of extensible jacks; and wherein the power operating means shall be directly connected to the lower member of each jack and to a detachable shoe by a common fastening means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

It is well known to those conversant with the uses and the problems attending the use of power operated cranes and similar vehicles such as draglines, excavating machines and the like that additional stabilizing means are necessary in order to impart additional rigidity and stability to the chassis of the vehicle when the equipment thereon is operated to produce a lateral pull or force upon the vehicle. It has been conventional practice to provide an outrigger construction for such vehicles consisting of a pair of cross members secured to the underside of the side frame members of the vehicle and extending transversely and laterally therefrom and with these cross members being in turn provided with longitudinally slidable extensions which may be moved between a retracted position to an extended position, in which latter position the ends of the extension are carried by suitable supports and serve to increase the stability of the chassis against lateral tilting about the longitudinal axis of the vehicle.

It is frequently difficult, however, and frequently time consuming upon various terrains to properly position the manually operated outriggers of the stabilizer construction in order to secure a firm support base for the vehicle. It is the basic purpose of this invention to overcome this difficulty by providing and combining with such conventional manually operated outrigger stabilizer constructions a power operated outrigger construction which shall be capable of operation automatically and by power means from a position remote from the outrigger jacks; and whereby the power operated construction shall be compactly mounted upon the vehicle frame and the manually operated stabilizer construction in a compact manner which will greatly rigidify and strengthen the entire association of these elements.

In my above identified copending application there is disclosed and claimed a construction in accordance with the two immediately preceding paragraphs of this specification. In the invention as disclosed and claimed herein, there is provided a unitary outrigger assembly consisting of both manually operated and power operated stabilizing outrigger elements but which may be readily applied to or removed from a chassis construction of a vehicle as a unitary assemblage, thereby adapting the principles of this invention to the conventional vehicle constructions and to enable them to be removed therefrom when their services are not longer required, and when it is desired to reduce weight for highway travel, as for example, to meet highway weight requirements for vehicles in certain states.

Figure 1:
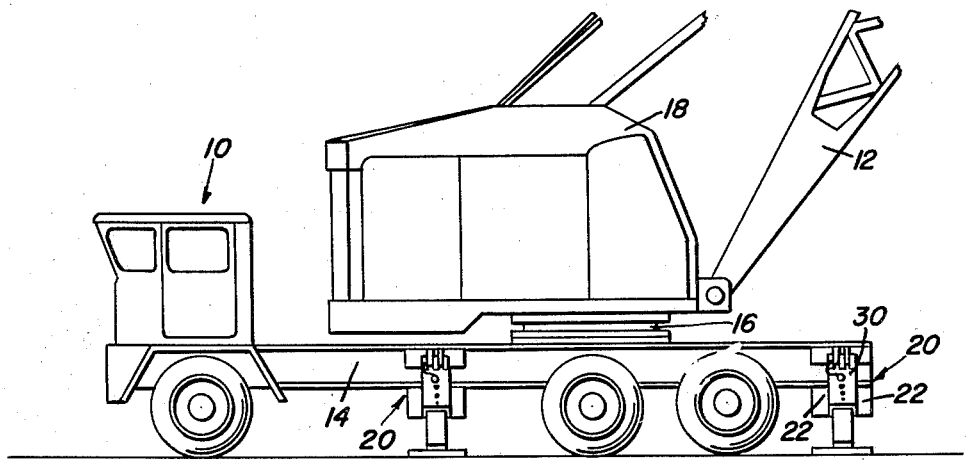
FIGURE 1 is a side elevational view showing a suitable form of mobile chassis to which the demountable power and manually operated outriggers of this invention have been applied and showing the power operated outriggers in their operative stabilizing position for the vehicles.

Referring first to FIGURE 1 it will be observed that the numeral 10 designates generally a mobile vehicle or carrier such as a motor crane having the usual crane boom or mast 12 thereon, the vehicle chassis including a pair of longitudinally extending side frame members 14 which are preferably of conventional I-beam construction. Conveniently there is mounted upon the chassis frame members a conventional form of turntable construction 16 by means of which a cab 18 housing the usual operating mechanism and control equipment for the boom 12 is mounted upon the chassis for rotation about a vertical axis. As will be apparent, when the crane or boom 12 is swung to one side of the chassis, lateral forces are induced which tend to upset or overturn the chassis. It is for this purpose that the outrigger constructions of this invention each designated by the numeral 20 are provided. As illustrated in FIGURE 1, two such outrigger constructions are shown provided one at the rearward end and one at the intermediate portion of the chassis frame members 14. Obviously, any desired number of or location of these outrigger constructions may be employed as desired.

In a well understood manner, the outrigger constructions serve to provide additional stabilizing support for the chassis of the vehicle resisting the tendency of the mast or boom 12 to overturn the vehicle when the mast and its load are disposed at one side of the same.

Figure 2:
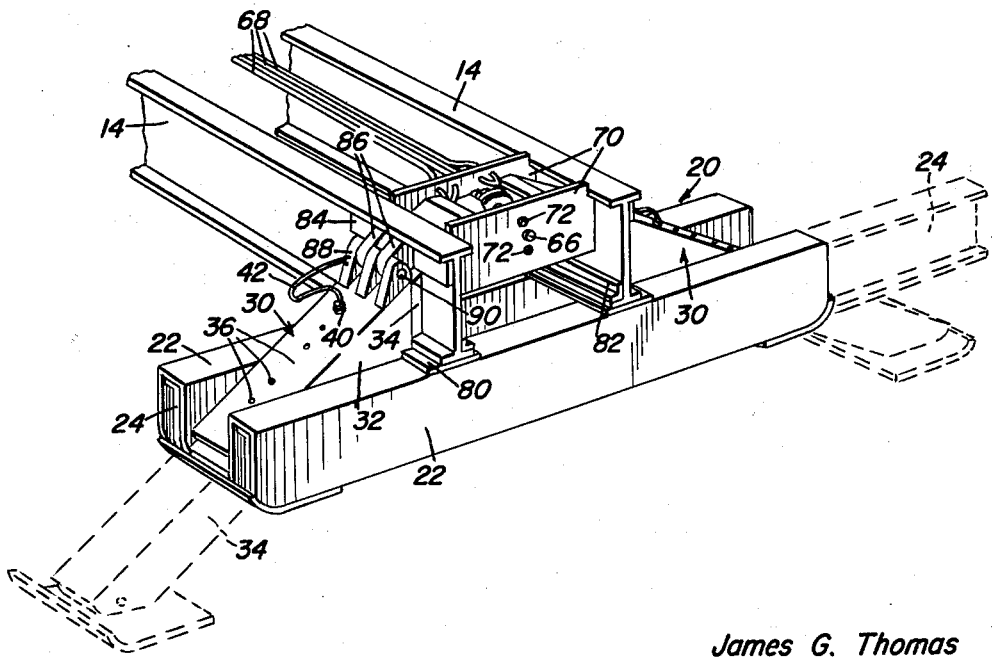
FIGURE 2 is a fragmentary perspective view of one of the demountable outrigger units in accordance with this invention, the retracted position of the manually operated and power operated stabilizer elements being shown in full lines therein and the extended or operative position thereof of certain of the elements being shown in dotted lines therein.
Figure 3:
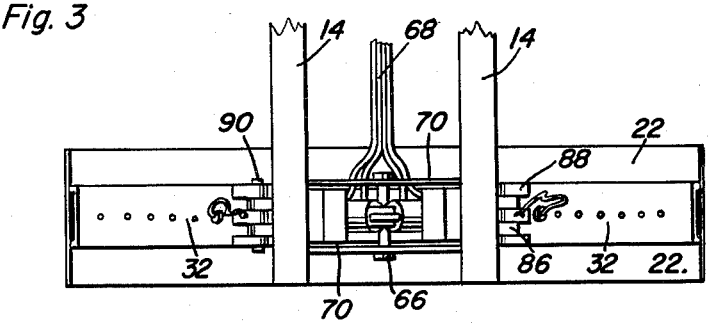
FIGURE 3 is a top plan view of the arrangement of FIGURE 2 but showing the parts in their retracted position.
Figure 4:
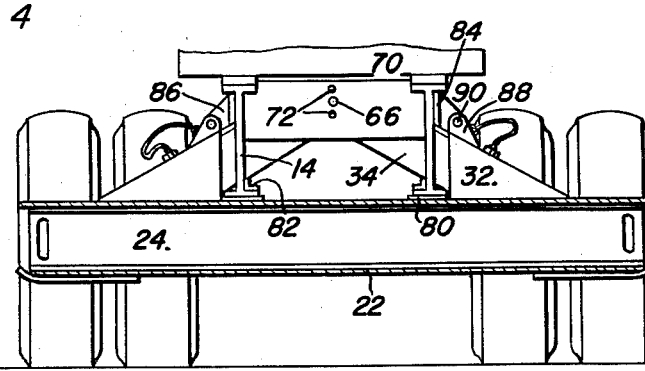
FIGURE 4 is a vertical longitudinal sectional view through one of the manually operated outrigger units of the assembly, the parts being shown in retracted position.

As shown more clearly in FIGURE 2, the demountable outrigger construction 20 consists of a pair of transversely extending rigid housings 22 which are open at their opposite ends and in which are slidably received the I-beam extensions 24 adapted to be manually extended or retracted as desired. When so extended, to a desired lateral distance to either side of the chassis of the vehicle 10, the outer ends of the extensions 24 may rest upon any suitable jacks or supports to thus provide additional stability to the vehicle.

Figure 6:
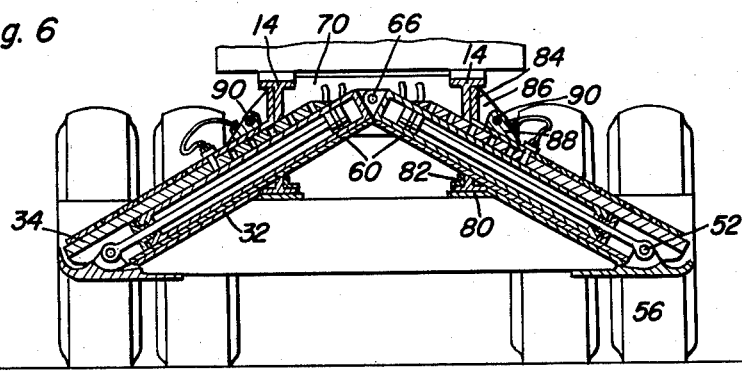
FIGURE 6 is a view in vertical transverse section through the power operated leg elements of the device and showing the legs in a retracted position.
Figure 7:
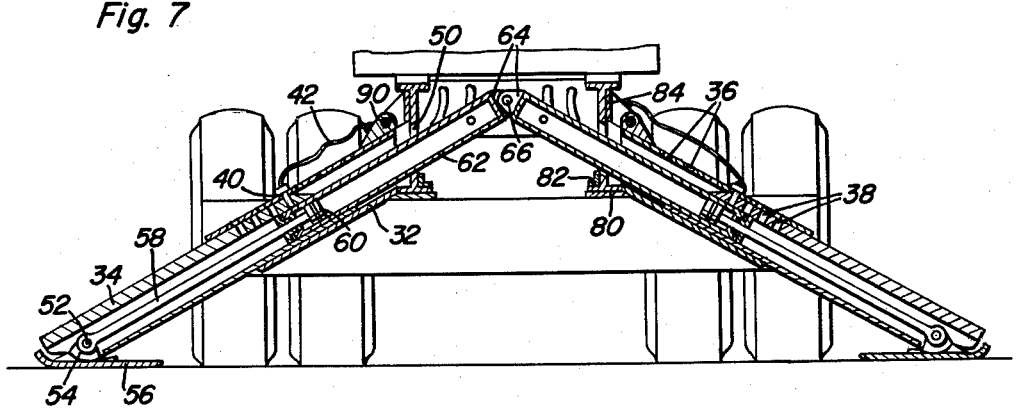
FIGURE 7 is a view similar to FIGURE 6 but showing the position of the device when the legs are in their extended position.

Disposed between the pair of manually operated outrigger members 22 are a pair of vertically inclined power operated longitudinally extensible outrigger legs or jacks each designated generally by the numeral 30. Each jack 30 includes a pair of telescoping housing sections, these comprising an upper relatively stationary housing section 32 which is open at both its upper and lower ends and is generally rectangular in cross section together with a similarly shaped relatively movable lower housing section 34. As shown in FIGURE 2 and FIGURES 6 and 7, the series of longitudinally spaced apertures 36 and 38 are provided respectively in adjacent sliding surfaces of the upper and lower sections 32 and 34 to selectively receive a locking pin 40 which may be retained as by a fastening cable or chain 42 whereby the sections may be selectively locked in retracted position as shown in FIGURE 6 or in their extended position as shown in FIGURE 7.

As will be best apparent from FIGURE 7, each of the chassis side frame members 14 have their vertical web portions provided with an enlarged aperture 50 therethrough of sufficient size to enable passage of the lower housing section 34 therethrough but to prevent passage of the upper housing section 32 therethrough as will be clearly apparent from FIGURES 6 and 7. Thus, in the retracted position of the jacks 30, the lower housing section will be drawn upwardly through the upper housing section through the openings 50 of the chassis frame members 14 and into the space between the chassis frame members thus compactly collapsing the power operated jacks. Alternatively, when a power operating means to be hereinafter set forth is operated, the jacks may be positively elongated with the inner sections being moved downwardly through the openings 50 in the chassis frame members 14, and downwardly through the upper housing sections 32 into the extended position shown in FIGURE 7 at which time the lower ends of the jacks are caused to bear upon the ground and thus further contribute toward the stability of the vehicle to which the outrigger construction is attached.

Referring now especially to FIGURES 6 and 7 it will be observed that the lower ends of the lower housing sections 34 are open and are cut off upon a plane inclined to the longitudinal axes of these sections. By means of pivot bolts or fasteners 52 extending through suitable journals, not shown, in the lower housing sections 34 and through apertured lugs 54 rising from the foot members 56, the foot members are secured to the lower housing sections and are also secured each to a piston rod 58 which has a piston 60 thereon slidably received in a hydraulic operating cylinder 62. The latter cylinder is slidably received in the lower section 34, see FIGURE 8, and has its upper closed end provided with a mounting bracket or lug 64 which is removably anchored as by means of a common fastening pin 66 with the adjacent cylinder of the adjacent jack to a portion of the vehicle chassis as set forth hereinafter. The arrangement is such that when fluid pressure is supplied through suitable control valves not shown, from a suitable source of fluid under pressure, not shown, through a series of fluid conduits 68, see FIGURE 2, hydraulic actuating means may be individually actuated to cause either positive retraction or longitudinal extension of the associated telescoping jack housing sections 32, 34 between the positions shown in FIGURES 6 and 7. In the retracted position, the fastening pin 40 may be engaged to retain the legs in a retracted position, while in the extended position, with the legs elongated to a sufficient extent to impart a desired lateral thrust stabilizing the vehicle chassis, the locking pin may be again inserted as shown in FIGURE 7 to thereby lock the legs in an extended position. When so locked, it is obvious that the hydraulic pressure may be released so that the entire load is then borne by mechanical structure of the upper and lower sections and the pin 40 of each of the jacks and is not carried by the hydraulic cylinders or pistons which thus serve only to apply the necessary force to retract or elongate the legs.

Figure 5:
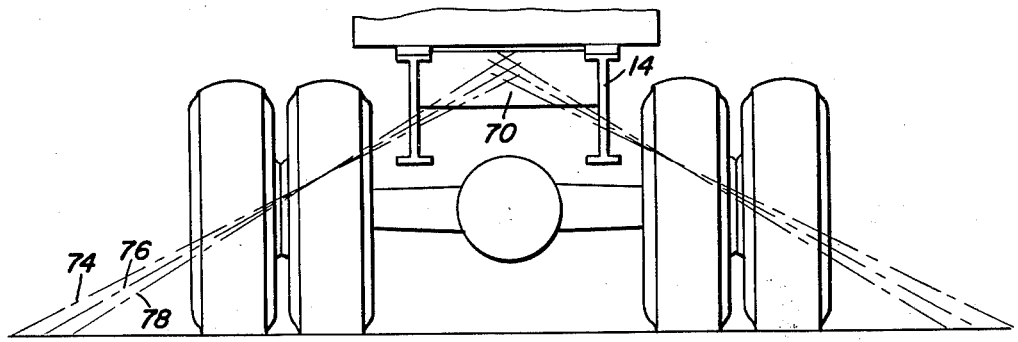
FIGURE 5 is a diagrammatic view taken in rear elevation and diagrammatically indicating different angular dispositions possible for the power operated outrigger legs of the device.
Figure 8:
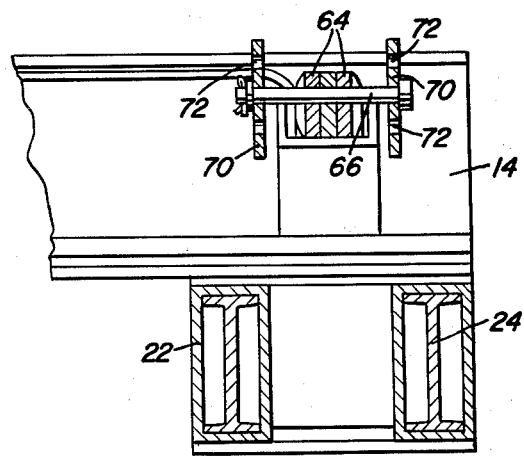
FIGURE 8 is a fragmentary detail view in vertical section showing the manner in which the hydraulic actuating means of the power operated extensible legs are detachably coupled or anchored to the unit.

In order to facilitate mounting of the hydraulic actuating means and to facilitate the disconnecting of the same, there are provided, see FIGURES 2 and 8, a pair of transversely extending mounting plates 70 which are welded to the inside surfaces of the longitudinal chassis frame members 14 adjacent the upper ends thereof and on opposite sides of the notches 50 or apertures made in the webs of these frame members. These plates thus serve to strengthen and reinforce the longitudinal frame members by forming therewith an A-frame and also support the ends of the hydraulic cylinders by means of the anchoring pin 66. The plates 70 are spaced apart a sufficient distance to enable both the lower section 34 to pass upwardly therebetween and if desired to be withdrawn therethrough when the foot 56 is disconnected therefrom, and also to permit insertion of and withdrawal of the hydraulic cylinder units therethrough when the anchoring pin 66 is removed. The anchoring pin 66 is selectively received in one of a series of vertically aligned apertures 72, see also FIGURE 8, which are formed in the plate 70 so that by positioning the locking pin 66 in a vertically selected set of apertures, the upper ends of the hydraulic cylinders 62 and the axes of the telescoping jacks may be placed at different included angles therebetween as shown in the diagrammatic showing of FIGURE 5. Thus, the lines 74, 76 and 78 indicate respectively the different angular positions which may be assumed by the axes of the telescoping legs and their hydraulic operating means by positioning the anchoring pin 66 in a selected one of a series of apertures 72.

It should be here noted that this feature for adjusting the included angle between the pairs of downwardly divergent jacks is employed only where the manufacturer wishes to initially dispose telescoping legs at a selected included angle with respect to each other. When these legs have been so disposed at a selected angle, the upper housing sections 32 are then welded to the manually operated outrigger housing 22 and further brace plates 80 are welded to the top surfaces of the pair of manually operated outrigger housings 22 and to the underside of the upper housing sections 32 so as to thus rigidly unite the members 22 and 32 to each other and to the brace plates 80. The brace plates 80 are then engaged against the underside of the I-beam longitudinal frame members 14 as shown in FIGURE 2 so as to properly position the assembly with respect to the chassis of the vehicle and to apply the load of the chassis to the outrigger assembly.

Additional brace members in the form of structural angle members as at 82 may be welded to the I-beams 14 adjacent the bottom flanges thereof to further rigidify and strengthen this construction to compensate for the weakening effect of the openings 50 formed therethrough.

A single detachable connection is provided for removably securing the upper housing sections 32 to the exterior surface of the adjacent I-beam chassis member 14. For this purpose, there is provided a mounting plate 84 which is welded to the exterior surface of the web of the I-beam as shown in FIGURE 2 and this mounting plate in turn carries a pair of apertured mounting lugs or brackets 86. Cooperating with these mounting brackets is a set of apertured lugs 88 which rise from the top surface of the upper section 32. A removable pin 90 is releasably received in the aligned apertures of the lugs 86 and 88 to thereby detachably connect the upper housing sections 32 to the mounting plates 84 secured to the exterior face of the longitudinal chassis frame members 14.

It will thus be evident that a unitary assemblage of the outrigger construction consisting of the rigidly connected housing members 22 and the upper housing section 32 together with the brace plates 80 attached thereto are removably secured to the chassis frame members 14 by means of the two pins 90 disposed on opposite sides of the chassis frame members. When it is desired to remove the assembly therefrom it is merely necessary to withdraw the anchor pin 66, disconnect the fluid line 68, pull the pins 90 whereupon the hydraulic cylinder 62 may be pushed downwardly into the upper housing sections 32 and the entire unit removed downwardly from the chassis frame members.

It will be observed that the mounting plate 84 carrying the hinge lugs 86 being welded to the web of the I-beam 14 serves to further brace and reinforce the same. In view of this construction, ample reinforcement is added to the I-beam 14 to compensate for the weakening effects of the notch 50 cut therein.

The actual construction and operation of the power operating means is identical with that set forth and claimed in my copending application and further description of the same is deemed to be unnecessary. The invention claimed herein resides in the construction of the outrigger assembly which enables the latter to be detachably mounted upon the chassis of a vehicle and which further enables the power operated longitudinally extensible jack elements 30 to be positioned at selected included angles prior to the final rigid connection of the members 32 and 22 to each other and to the brace plate 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An outrigger construction for vehicles of the type having a mobile chassis provided with longitudinally extending spaced side frame members, said construction comprising a pair of vertically inclined longitudinally extensible jacks secured to and carried by opposite sides of said chassis, said jacks having their central axes lying in a common vertical plane transverse said chassis, said jacks being downwardly divergent at their lower ends, each jack comprising a telescoping upper outer member and a lower inner member slidable therein and therethrough, fastening means securing each upper member to the exterior side surface of a side frame member.

2. The combination of claim 1 wherein said construction includes a pair of transversely extending manual outrigger housings each rigidly secured to, bracing and embracing each of said upper housings therebetween.

3. The combination of claim 2 including brace plates rigidly secured to said manual outrigger housings and to said upper housings and adapted to abut and support the under side of a side frame member.

4. The combination of claim 1 wherein said side frame members have openings therethrough of such size as to preclude passage of said upper members therethrough but to enable said lower members to be retracted therethrough into the space between said side frame members, transverse plates extending between and rigidly secured to each of said side frame members and on opposite longitudinally spaced sides of said openings, power operating means anchored to said transverse plates and extending through said openings into said jacks and means connecting said power operating means to said lower sections, said plates having a series of aligned pairs of spaced apertures, a fastener secured to said power operating means and engaged in a selected pair of apertures whereby to dispose said pair of jacks at a selected one of a series of inclined angular positions.

5. The combination of claim 4 including a pair of transversely extending manual outrigger housings each rigidly secured to, bracing and embracing each of said upper housings therebetween.

6. The combination of claim 5 including brace plates rigidly secured to said manual outrigger housings and to said upper housings and adapted to abut and support the under side of a side frame member.

7. The combination of claim 1 wherein said axes of said jacks intersect at a point lying between said side frame members and between the top and bottom surfaces thereof.

8. An outrigger construction for vehicles of the type having a mobile chassis provided with longitudinally extending spaced side frame members, said construction comprising a pair of vertically inclined longitudinally extensible jacks secured to and carried by opposite sides of said chassis, said jacks being downwardly divergent at their lower ends, each jack comprising a telescoping upper outer member and a lower inner member slidable therein and therethrough, fastening means detachably securing each upper member to the exterior side surface of a side frame member, said side frame members having openings therethrough of such size as to preclude passage of said upper members therethrough but to enable said lower members to be retracted therethrough into the space between said side frame members.

9. The combination of claim 8 including transverse plates extending between and rigidly secured to said side frame members in longitudinally spaced relation thereon on opposite sides of said openings.

10. The combination of claim 9 including power operating means anchored to and disposed between said transverse plates and extending through said openings into said jacks and means connecting said power operating means to said lower sections.

11. The combination of claim 8 wherein said fastening means comprises cooperating apertured lugs on said side frame members and on said upper housings and a pin releasably received in said apertured lugs.

12. The combination of claim 11 including a mounting plate fixedly secured upon the exterior surface of each side frame member adjacent an edge of the opening therein, some of said lugs being carried by and projecting laterally from said mounting plate.

13. The combination of claim 8 wherein said jacks have longitudinal central axes lying in a common vertical plane extending transverse said frame members.

14. The combination of claim 8 wherein said jacks have longitudinal central axes lying in a common vertical plane extending transverse said frame members, and said axes intersecting at a point lying between said side frame members and between the top and bottom surfaces thereof.

15. An outrigger construction for vehicles of the type having a mobile chassis provided with longitudinally extending spaced side frame members, said construction comprising a pair of vertically inclined longitudinally extensible jacks secured to and carried by opposite sides of said chassis, said jacks being downwardly divergent at their lower ends, each jack comprising a telescoping upper outer member and a lower inner member slidable therein and therethrough, fastening means detachably securing each upper member to the exterior side surface of a side frame member, said side frame members having openings therethrough of such size as to preclude passage of said upper members therethrough but to enable said lower members to be retracted therethrough into the space between said side frame members, transverse plates extending between and rigidly secured to said side frame members and on opposite sides of said openings, power operating means anchored to said transverse plates and extending through said openings into said jacks and means connecting said power operating means to said lower sections.

16. An outrigger construction for vehicles of the type having a mobile chassis provided with longitudinally extending spaced side frame members, said construction comprising a pair of vertically inclined longitudinally extensible jacks secured to and carried by opposite sides of said chassis, said jacks being downwardly divergent at their lower ends, each jack comprising a telescoping upper outer member and a lower inner member slidable therein and therethrough, fastening means detachably securing each upper member to the exterior side surface of a side frame member, said side frame members having openings therethrough of such size as to preclude passage of said upper members therethrough but to enable said lower members to be retracted therethrough into the space between said side frame members, brace means secured to said side frame members adjacent said openings for strengthening said side frame members.

17. A unitary detachable outrigger construction for vehicles of the type having a mobile chassis including laterally spaced longitudinally extending side frame members, said construction comprising a pair of manually operable outrigger housings positioned for extending transversely beneath said side frame members, a pair of vertically inclined downwardly divergent longitudinally extensible jacks each disposed between and rigidly secured to each one of said pair of outrigger housings, each jack comprising a pair of telescoping upper and lower housings, said jacks having central longitudinal axes lying in a common vertical plane which is transverse said frame members, means securing each jack upper housing to one of said side frame members at the outside thereof, power operating means connected to said chassis between said frame members and to said lower housings for effecting relative retraction and extension of said upper and lower housings.

18. The combination of claim 17, wherein said side frame members have openings therethrough of such size as to preclude passage of said upper members therethrough but to enable said lower members to be retracted therethrough into the space between said side frame members.

References Cited in the file of this patent

UNITED STATES PATENTS

| 2,209,392 | Edwards | July 30, 1940 |
| 2,436,799 | Frost | Mar. 2, 1948 |
| 2,740,538 | Felkner | Apr. 3, 1956 |
| 3,019,913 | Bowman | Feb. 6, 1962 |
| 3,021,015 | Bowman | Feb. 13, 1962 |